United States Patent
O'Kell

(10) Patent No.: US 10,279,910 B2
(45) Date of Patent: May 7, 2019

(54) LIGHTING SYSTEMS

(71) Applicant: Saf-T-Glo Limited, Norfolk (GB)

(72) Inventor: Sean Patrick O'Kell, South Glamorgan (GB)

(73) Assignee: SAF-T-GLO LIMITED (GB)

( * ) Notice: Subject to any disclaimer, the term of this patent is extended or adjusted under 35 U.S.C. 154(b) by 0 days.

(21) Appl. No.: 15/125,966

(22) PCT Filed: Mar. 13, 2015

(86) PCT No.: PCT/GB2015/050746
§ 371 (c)(1),
(2) Date: Sep. 13, 2016

(87) PCT Pub. No.: WO2015/136307
PCT Pub. Date: Sep. 17, 2015

(65) Prior Publication Data
US 2017/0029112 A1    Feb. 2, 2017

(30) Foreign Application Priority Data

Mar. 14, 2014 (GB) .................................. 1404659.3
Mar. 14, 2014 (GB) .................................. 1404660.1
Mar. 14, 2014 (GB) .................................. 1404661.9
Mar. 14, 2014 (GB) .................................. 1404662.7

(51) Int. Cl.
*B64D 11/00* (2006.01)
*F21V 9/30* (2018.01)
(Continued)

(52) U.S. Cl.
CPC ............... *B64D 11/00* (2013.01); *B60Q 3/43* (2017.02); *B60Q 3/46* (2017.02); *B60Q 3/47* (2017.02); *B60Q 3/51* (2017.02); *B64D 47/02* (2013.01); *F21S 4/28* (2016.01); *F21V 9/30* (2018.02); *H05B 37/0272* (2013.01); *B64D 2011/0038* (2013.01); *B64D 2203/00* (2013.01)

(58) Field of Classification Search
CPC  B64D 11/00; B64D 47/02; B64D 2011/0038; B64D 2203/00; B60Q 3/47; B60Q 3/43; B60Q 3/51; B60Q 3/46; F21V 9/16; H05B 37/0272; F21S 4/28
See application file for complete search history.

(56) References Cited

U.S. PATENT DOCUMENTS 2,782,295 A    8/1954  Schwenkler
5,642,934 A    7/1997  Haddad
(Continued)

*Primary Examiner* — Y M. Lee
(74) *Attorney, Agent, or Firm* — Foley & Lardner LLP

(57) ABSTRACT

A lighting system for an aircraft cabin includes an electrical light source and a photoluminescent light source. The electrical light source is provided at or near a ceiling of the aircraft cabin and the photoluminescent light source is arranged at or near floor level. The photoluminescent light source defines a path along which passengers can move to an exit and is located in an area that receives a light output from the electrical light source to charge the photoluminescent light source. The electrical light source is adjustable to alter the orientation of the light source to concentrate the light output in the area of the photoluminescent light source to enhance charging of the photoluminescent light source by the electrical light source.

18 Claims, 8 Drawing Sheets

(51) Int. Cl.

| | | |
|---|---|---|
| *B64D 47/02* | (2006.01) | |
| *F21S 4/28* | (2016.01) | |
| *H05B 37/02* | (2006.01) | |
| *B60Q 3/51* | (2017.01) | |
| *B60Q 3/46* | (2017.01) | |
| *B60Q 3/43* | (2017.01) | |
| *B60Q 3/47* | (2017.01) | |

(56) References Cited

U.S. PATENT DOCUMENTS

| | | |
|---|---|---|
| 5,724,909 A | 3/1998 | Pitman et al. |
| 5,775,016 A | 7/1998 | Chien |
| 5,961,072 A | 10/1999 | Bodle |
| 6,307,207 B1 | 10/2001 | Burbank |
| 7,148,632 B2 | 12/2006 | Berman et al. |
| 8,531,134 B2 | 9/2013 | Chemel et al. |
| 2004/0105261 A1 | 6/2004 | Ducharme et al. |
| 2004/0160199 A1 | 8/2004 | Morgan et al. |
| 2004/0183480 A1 | 9/2004 | Halter |
| 2004/0245946 A1 | 12/2004 | Halter |
| 2006/0111793 A1 | 5/2006 | Stokes et al. |
| 2008/0253139 A1* | 10/2008 | Stokes ............... A62B 3/00 362/471 |
| 2009/0040782 A1 | 2/2009 | Liu et al. |
| 2010/0254146 A1 | 10/2010 | McCanless |
| 2010/0254148 A1 | 10/2010 | Huang et al. |
| 2011/0141722 A1 | 6/2011 | Acampora et al. |
| 2012/0019164 A1 | 1/2012 | Gambeski et al. |
| 2013/0016517 A1 | 1/2013 | Eckel et al. |
| 2013/0038241 A1 | 2/2013 | Johannessen et al. |
| 2013/0221852 A1 | 8/2013 | Bowers et al. |

\* cited by examiner

LIGHTING SYSTEMS

CROSS-REFERENCE TO RELATED PATENT APPLICATIONS

The present application is a U.S. National Stage application of International Application No. PCT/GB2015/050746, filed Mar. 13, 2015, which claims priority to and the benefit of each of the following United Kingdom Patent Applications, the entire disclosures of which are incorporated herein by reference: United Kingdom Application No. 1404659.3, filed Mar. 14, 2014; United Kingdom Application No. 1404661.9, filed Mar. 14, 2014; United Kingdom Application No. 1404662.7, filed Mar. 14, 2014; and United Kingdom Priority Application 1404660.1, filed Mar. 14, 2014.

BACKGROUND

This invention concerns improvements in or relating to lighting systems. This invention has particular, but not exclusive, application to passenger transport vehicles (PTVs) such as aircraft, trains, buses and coaches. More especially, the invention is concerned with aircraft cabin lighting systems and parts and fittings for such lighting systems.

SUMMARY

In a first aspect the invention provides a light for an aircraft comprising an elongate casing housing a light source, wherein the casing has an elongate base and an elongate cover secured together along both sides of the casing by co-operating formations on the base and cover.

It may be that the co-operating formations comprise longitudinal formations along the sides of the base and cover that are engageable to secure the cover to the base.

It may be that the co-operating formations are releasable such that the cover is detachable from the base.

It may be that the co-operating formations engage with a snap action.

It may be that the base is channel-section and the cover is of semi-circular section.

It may be that the co-operating formations comprise internal longitudinal channel formations on sidewalls of the base and external longitudinal rib formations on side edges of the cover that are engageable to secure the cover to the base.

It may be that the light further comprises an elongate support member for mounting the light source in the cover.

It may be that the cover has longitudinal formations configured to locate longitudinal side edges of the support member along both sides of the casing to mount the support member in the cover.

It may be that the cover is configured to provide internal longitudinal grooves to receive and retain the side edges of the support member.

It may be that the light source comprises a plurality of light emitting diodes mounted on the support member and located wholly within the cover.

It may be that the light further comprises end caps at both ends of the casing.

It may be that the base is configured for attaching a bracket to mount the light on a support surface.

An embodiment provides an aircraft having a passenger cabin having an electrical lighting system comprising a plurality of lights arranged along the length of the cabin, each light being in accordance with the first aspect.

It may be that a first plurality of lights are ceiling lights and a second plurality of lights are wall lights.

In a second aspect the invention provides a bracket for mounting a light, wherein the bracket has a connector portion for attaching to the light, and the connector portion is adjustable to change the orientation of the light.

It may be that the bracket has a base portion for securing to a mounting surface and the connector portion is adjustable relative to the base portion to alter the orientation of the light.

It may be that the connector portion is configured for pivotal movement relative to the base to adjust an angle at which the connector portion extends to the base portion.

It may be that the connector portion is attached to the bracket portion by a hinge portion and a device is provided to pivot the connector portion about the hinge portion to adjust the angle between the connector portion and the base portion.

It may be that the device is configured to provide continuous adjustment of the angle over a pre-determined range of adjustment.

It may be that the device is configured to provide stepwise adjustment of the angle over a pre-determined range of adjustment.

It may be that the range of adjustment is from 0 to 180 degrees.

It may be that the light comprises an elongate casing housing a light source and is configured for attaching to the connector portion of the bracket.

It may be that the casing has longitudinal formations along both sides and the connector portion of the bracket is engageable with the formations to secure the casing to the bracket.

It may be that the bracket can be secured at any position along the length of the casing.

It may be that the casing is detachable from the bracket.

It may be that the light source comprises a plurality of light emitting diodes.

It may be that the bracket is configured for mounting a ceiling light on top of a storage unit extending along the length of a cabin of an aircraft at or near to the ceiling.

It may be that the light is in accordance with the first aspect of the invention.

An embodiment provides an aircraft having a passenger cabin having an electrical lighting system comprising a plurality of lights arranged along the length of the cabin, at least one light being mounted by a bracket in accordance with the second aspect.

In a third aspect the invention provides a light having a light source and an interface, wherein the light source is programmable via the interface for calibrating light intensity and/or colour of a light output of the light source.

It may be that calibration of the light intensity and/or colour of the light output is stored in a memory.

It may be that the memory is configured to prevent inadvertent or unauthorised access.

It may be that the light further comprises a plurality of light intensity settings.

It may be that the light intensity settings include low, medium and high settings.

It may be that the light source is programmable remotely via a wired or wireless link.

It may be that the interface includes a receiver for programming the light source via a control device having a transmitter for communicating with the receiver.

It may be that the control device communicates with the receiver via an infra-red link.

It may be that the light source comprises a plurality of light emitting diodes.

It may be that the light emitting diodes are mounted on a carrier including a printed circuit board configured to control the light intensity and/or colour of the light output of the light emitting diodes in response to calibration of the light output.

It may be that the light is in accordance with the first aspect of the invention.

It may that the light is mounted by a bracket for adjusting an orientation of the light in accordance with the second aspect of the invention.

An embodiment provides an aircraft having a passenger cabin provided with an electrical lighting system for illuminating the ceiling and/or wall of the cabin, wherein the lighting system has a plurality of lights according to the third aspect of the invention.

It may be that a plurality of ceiling lights are provided wherein the light output of any ceiling light can be calibrated to be the same as or different from the light output of any other ceiling light.

It may be that a plurality of wall lights are provided wherein the light output of any wall light can be calibrated to be the same as or different from the light output of any other wall light.

In a fourth aspect the invention provides a lighting system for an aircraft cabin, the lighting system including an electrical light source and a photoluminescent light source, wherein the electrical light source is configured to charge the photoluminescent light source.

It may be that the photoluminescent light source is arranged at or near floor level for guiding passengers to an exit and the electrical light source is provided at or near a ceiling of the aircraft and is configured such that an area in which the photoluminescent material is located receives a light output from the electrical light source to charge the photoluminescent material.

It may be that the photoluminescent material is arranged in a track on the floor along an aisle of the aircraft cabin so that an upper surface of the track is exposed to light from the electrical light source and the photoluminescent material is charged by light through the upper surface of the track.

It may be that the electrical light source is adjustable to configure the light source so that the light output is more concentrated in the area of the aisle.

It may be that the electrical light source is housed in an elongate casing, wherein the casing has an elongate base and an elongate cover secured together along both sides of the casing by co-operating formations on the base and cover.

It may be that the electrical light source comprises a plurality of lights mounted along the length of the cabin, wherein the mounting is adjustable to alter the orientation of the lights to concentrate the light output in the area of the aisle. The lights may be in accordance with the first aspect of the invention.

It may be that each light has a plurality of light emitting diodes whereby altering the orientation of the lights changes the direction of the light output from the light emitting diodes.

It may be that the lights are mounted on brackets and the brackets are adjustable to alter the orientation of the lights. The brackets may be in accordance with the second aspect of the invention.

It may be that the brackets are configured to provide continuous adjustment of the angular orientation over a pre-determined range of adjustment.

It may be that the brackets are configured to provide stepwise adjustment of the angular orientation over a pre-determined range of adjustment.

It may be that the range of adjustment is from 0 to 180 degrees.

It may be that the lights are located on top of storage units extending along the length of the cabin to illuminate the ceiling and the orientation of the lights is adjusted so that light reflected from the ceiling is more concentrated in the area of the aisle.

It may be that the lights have a light source and an interface, wherein the light source is programmable via the interface for calibrating light intensity and/or colour of a light output of the light source. The lights may be in accordance with third aspect of the invention.

Any of the preceding aspects of the invention may be employed separately or in combination with any other aspect(s) of the invention. For example the first aspect of the invention may be combined with any of the second, third and fourth aspects of the invention. Some embodiments may comprise a single aspect of the invention. Other embodiments may comprise a combination of any two or more aspects of the invention. At least one embodiment may comprise a combination of all aspects of the invention.

Any feature of any of the preceding aspects of the invention may be employed separately or in combination with any other feature(s) of the same or different aspects of the invention.

BRIEF DESCRIPTION OF THE DRAWINGS

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein will become apparent in the detailed description set forth herein and taken in conjunction with the accompanying drawings wherein.

DETAILED DESCRIPTION

Figure 1:
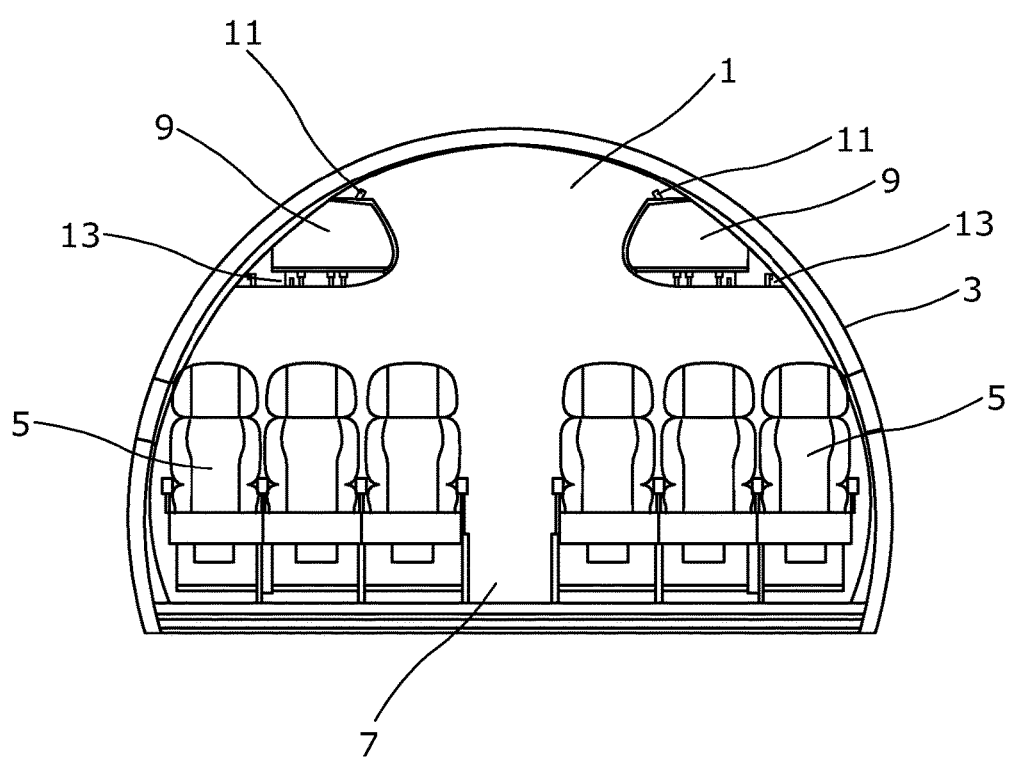
FIG. 1 is a sectional view of an aircraft cabin.

Referring first to FIG. 1, there is shown a schematic lay-out of the interior of an aircraft cabin 1 within the aircraft fuselage 3. The cabin 1 is provided with passenger seats 5 on both sides of a central aisle 7 for movement of passengers to their allocated seats on boarding the aircraft and to the aircraft exit(s) on leaving the aircraft. The seats 5 are arranged in rows (one only shown) spaced apart along the length of the cabin. Located above the seats 5 on both sides of the aisle 7 are overhead storage units 9 that extend along the length of the cabin.

In this embodiment, there are six seats 5 in each row, three either side of the aisle 7. It will be understood however that the number and layout of the seats 5 and/or aisles 7 and/or storage units 9 may vary according to the type of aircraft and the layout shown is not limiting on the scope of the invention.

The cabin 1 is provided with a lighting system including ceiling lights 11 located on top of the storage units 9 on both sides of the aisle 7 and wall lights 13 located on the underside of the storage units 9 on both sides of the aisle 7. Other locations of the ceiling lights 11 and wall lights 13 may be employed. In some arrangements, it may be that the wall lights 13 are omitted. In other arrangements it may be that the ceiling lights 11 are omitted.

The ceiling lights 11 and wall lights 13 are preferably arranged along the length of the cabin. The ceiling lights 11 may be orientated to illuminate the cabin ceiling and the wall lights 13 may be orientated to illuminate the cabin walls. The ceiling lights 11 and wall lights 13 may comprise any suitable light source such as a fluorescent light source or a light emitting diode (LED) light source.

Where an LED light source is employed, the light source may be controlled to vary the brightness and/or colour of the emitted light. A power source for the ceiling lights 11 and wall lights 13 may be provided by the aircraft power supply (not shown). Controls for the ceiling lights 11 and wall lights 13 may be arranged for operation by the flight crew and/or cabin crew.

Figure 2:
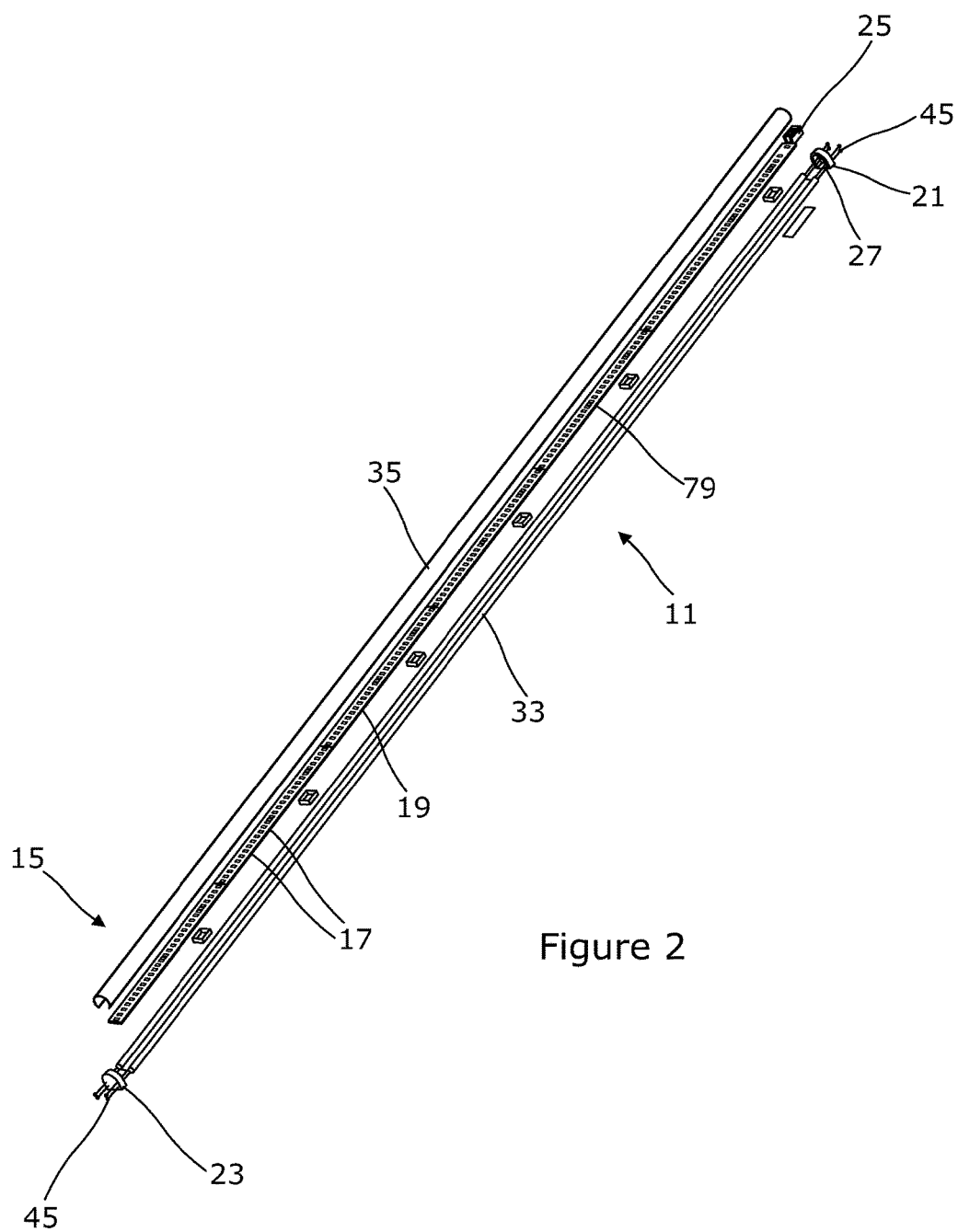
FIG. 2 is an exploded perspective view of a ceiling light unit.

A ceiling light 11 is shown in more detail in FIG. 2. The ceiling light 11 has an elongate casing 15 housing a plurality of LEDs 17. The LEDs 17 are preferably spaced apart along the length of the casing 15. The LEDs may be mounted on a support member 19. The support member 19 preferably extends the length of the casing 15. The support member 19 may comprise at least one printed circuit board. The casing 15 may further include end caps 21, 23. The LEDs may be arranged in one or more strings. The LEDs provide visible light for illumination. The LEDs may provide white light and/or coloured light.

The ceiling light 11 is connectable to the power source to power the LEDs. For example, the support member 19 may have a connector 25 at one end that is received in an opening 27 in the end cap 21 for releasably attaching a mating connector 29 of a power supply cable 31 (FIG. 5) to connect the support member 19 to the power source to power the LEDs. Each ceiling light 11 is preferably connected to the power source by a separate power supply cable 31. Each ceiling light 11 may be operated independently of the other ceiling lights.

Figure 3:
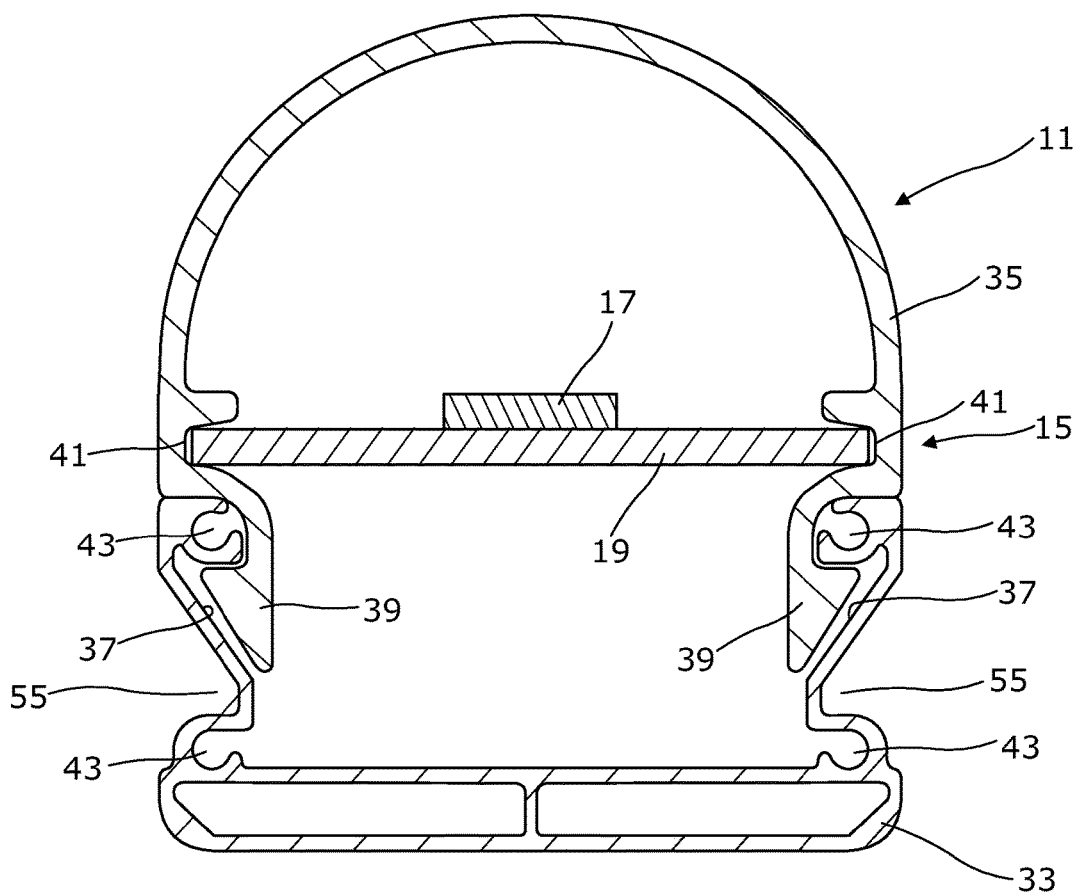
FIG. 3 is a sectional view of the light unit shown in FIG. 2.

A sectional view of the assembled casing 15, LEDs 17 and support member 19 is shown in FIG. 3. The casing 15 comprises a base 33 and a cover 35. The base 33 is preferably opaque. The cover 35 is preferably transparent or translucent. The base 33 may be made of metal or alloy, for example aluminium, although other materials may be used including plastics and composites of plastics with metal or alloy. The cover 35 may be made of plastics, for example polycarbonate, although other materials may be employed. The base 33 may be an extrusion and may be cut to length from an extruded profile. The cover 35 may be an extrusion and may be cut to length from an extruded profile.

The base 33 and cover 35 may be releasably secured together. For example the base 33 and cover 35 may have longitudinal formations configured to engage along both sides of the casing 15 to secure the cover 35 to the base 33.

The formations may engage with a snap action that allows the cover 35 to be clipped onto the base 33. The base 33 may be of channel-section. The cover 35 may be of semi-circular section. Sidewalls of the base 33 may be configured to provide internal longitudinal channel formations 37 that receive and retain external longitudinal rib formations 39 on side edges of the cover 33 to secure the cover 35 to the base 33.

The support member 19 is preferably mounted in the cover 35. For example, the cover 35 may have longitudinal formations configured to locate longitudinal side edges of the support member 19 along both sides of the casing 15 to mount the support member 19 in the cover 35. The cover 35 may be configured to provide internal longitudinal grooves 41 to receive and retain the side edges of the support member 19. The LEDs 17 are located wholly within the cover 35. This may assist to optimise the illumination provided by the LEDs 17.

Once the base 33 and cover 35 are assembled with the support member 19 located in the cover 35, the end caps 21, 23 can be attached to the ends of the casing 15. It may be that the end caps 21, 23 are releasably attached at the ends of the casing 15. For example, sidewalls of the base 33 may be provided with one or more formations to receive a fastener to secure the end caps 21, 23. The sidewalls of the base 33 may be provided with longitudinal openings 43 to receive screws 45 to attach the end caps 21, 23. The screws 45 may be self-tapping.

Figure 4:
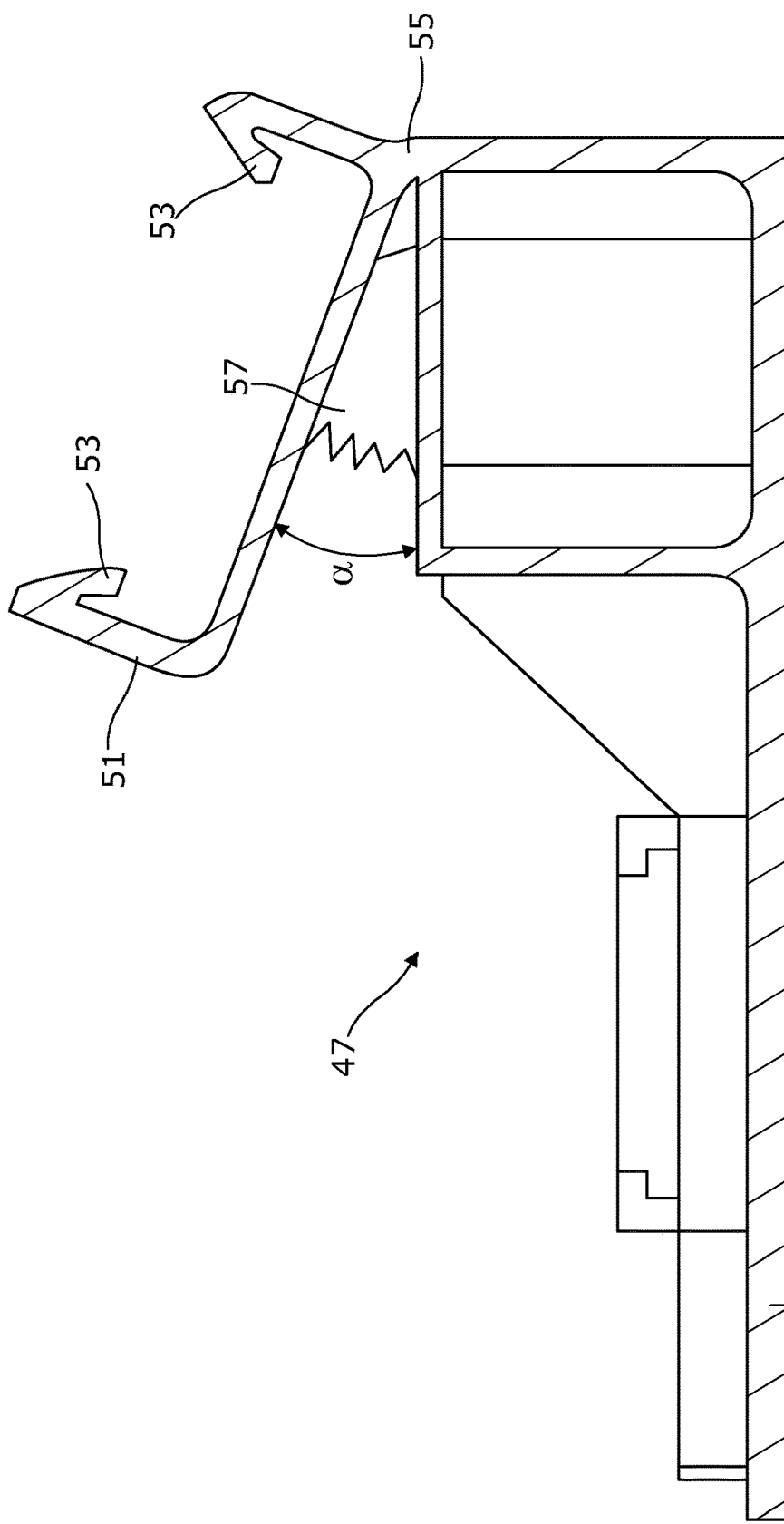
FIG. 4 shows a bracket for mounting the ceiling light.
Figure 5:
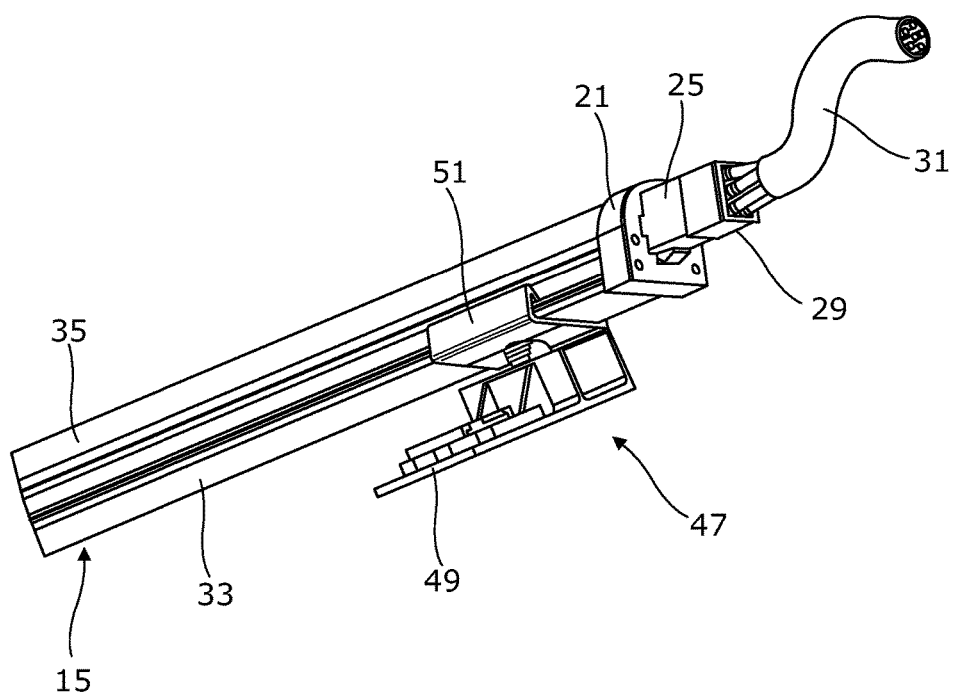
FIG. 5 is a perspective view showing the bracket attached to the ceiling light

A bracket 47 for mounting the ceiling light 11 is shown in FIG. 4 and attached to the ceiling light 11 in FIG. 5. The bracket 47 has a base 49 for securing to a mounting surface, for example the top of the storage units 9 and a connector 51 for attaching the ceiling light 11.

The base 49 may be rectangular in plan view although other shapes may be employed. The bracket 47 may be secured to the mounting surface by one or more fasteners, preferably in a releasable manner. For example the bracket 47 may be secured by one or more screws.

The connector 51 is preferably configured to receive and retain the base 33 of the casing 15 of the ceiling light 11 to secure the casing 15 to the bracket 47. The base 33 and connector 51 may be releasably secured together. For example the base 33 and connector 51 may have longitudinal formations configured to engage along both sides of the casing 15 to secure the casing 15 to the bracket 47. The formations may engage with a snap action that allows the casing 15 to be clipped onto the bracket 47. The connector 51 may be of channel-section. Sidewalls of the connector 51 may be configured to provide internal longitudinal rib formations 53 and sidewalls of the base 33 may be configured to provide external longitudinal channel formations 55 that receive and retain the longitudinal rib formations 53 to secure the casing 15 to the bracket 47.

Figure 6:
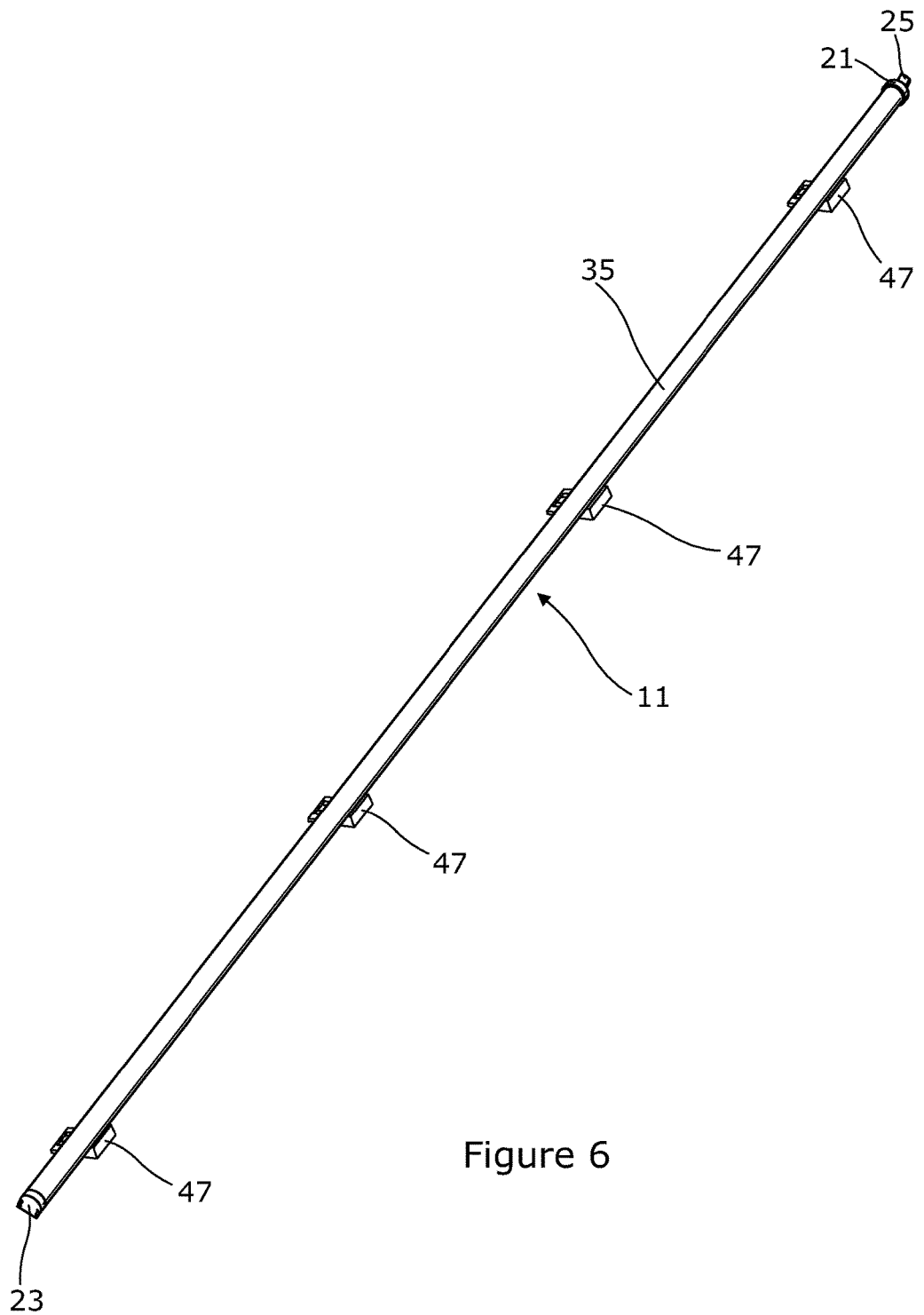
FIG. 6 is a perspective view showing the ceiling light with four brackets attached.

As will be understood, the ceiling light 11 can be provided in a range of lengths to adapt the lighting system for different aircraft and, depending on the length of the ceiling light 11, one or more brackets 47 may be attached spaced apart along the length of the casing 15 to provide adequate support for installation of the ceiling light 11. For example, FIG. 6 shows four brackets 47 spaced apart along the length of the ceiling light 11.

The connector 51 preferably extends at an angle "α" to the base 49. The angle may be chosen to orientate the ceiling light 11 to control the direction of the light output from the LEDs. The angle may be fixed and brackets 47 provided having a range of angles for the installer to select and fit the appropriate bracket 47. Alternatively, the bracket may be adjustable to vary the angle. For example, the connector 51 may be configured for pivotal movement relative to the base 49 to adjust the angle at which the connector 51 extends to the base. It may be that the connector 51 is attached to the bracket 47 by a hinge portion 55 and a device 57 is provided to pivot the connector 51 about the hinge portion 55 to adjust the angle between the connector 51 and the base 49.

The device 57 may provide continuous adjustment of the angle over the range. For example pivotal movement may be controlled by a screw type adjuster or similar. Alternatively, the device 57 may provide stepwise adjustment of the angle over the range. For example pivotal movement may be controlled by a ratchet type adjuster or similar. The range of adjustment may be from 0 to 180 degrees, preferably from 0 to 90 degrees, more preferably from 15 to 75 degrees and most preferably from 30 to 60 degrees.

Figure 7:
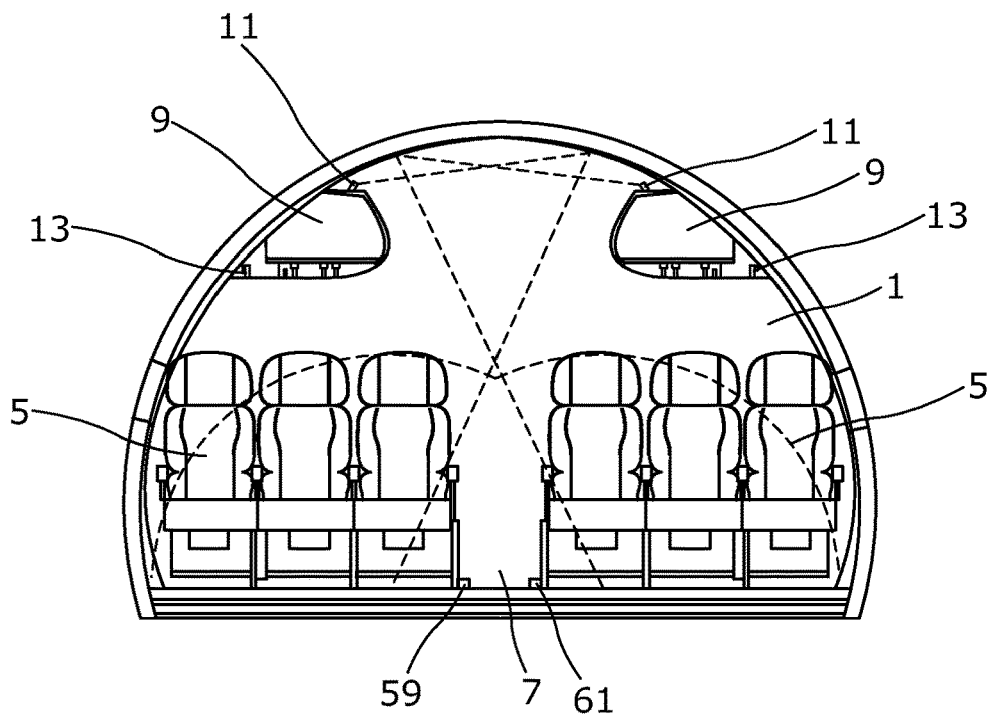
FIGS. 7 to 9 are sectional views similar to FIG. 1 showing the light output for different orientations of the ceiling lights.
Figure 8:
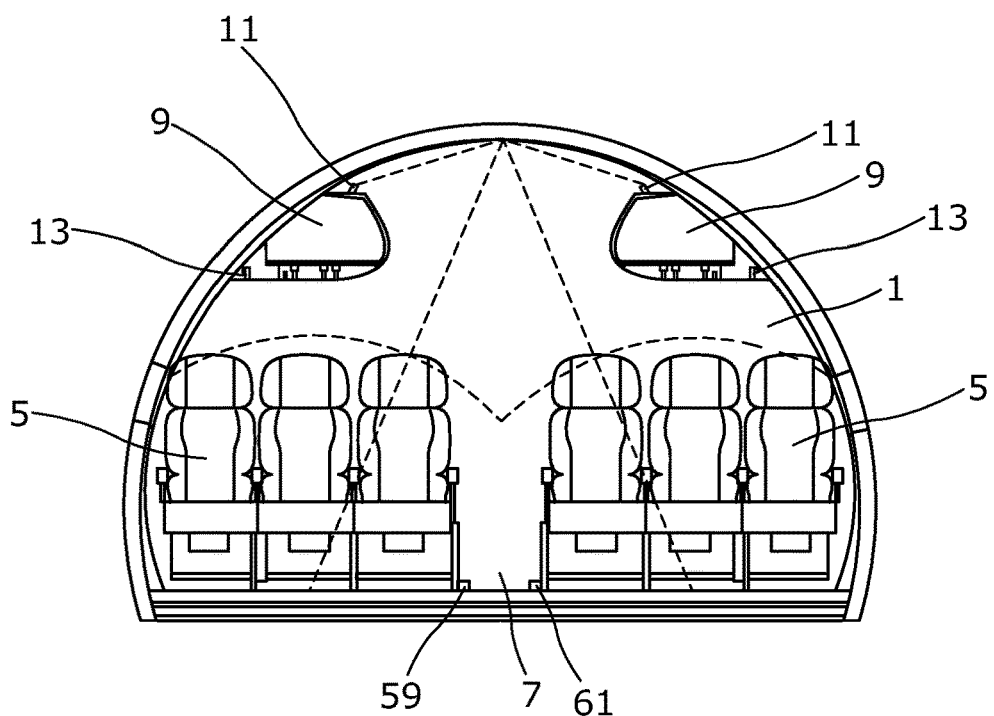
Figure 9:
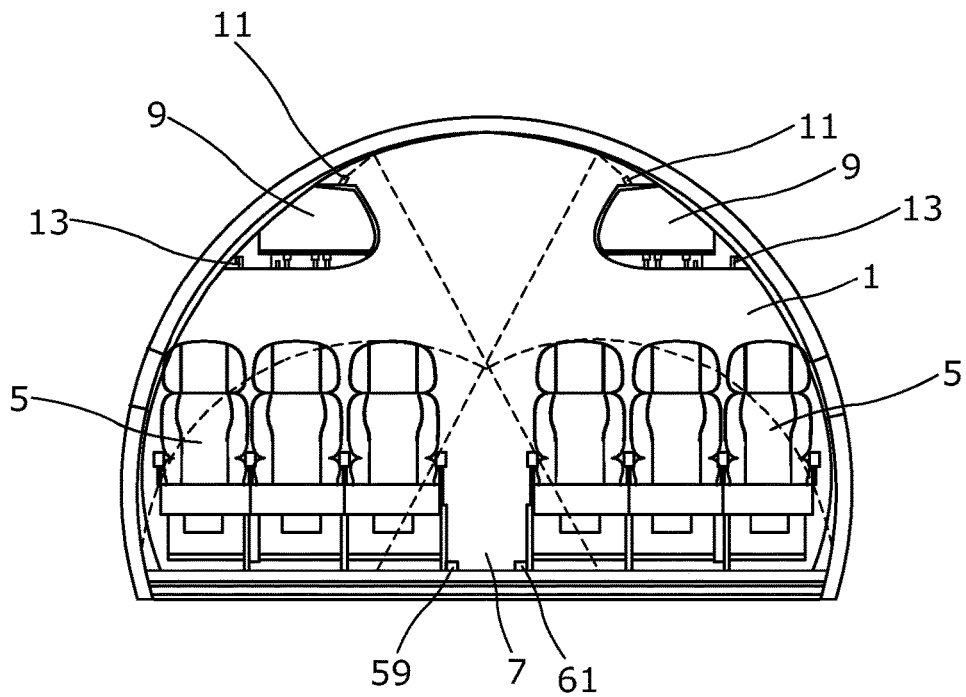

Adjusting the orientation of the ceiling lights 11 changes the direction of the light output. FIG. 7 shows the light output for a bracket angle of 30 degrees, FIG. 8 shows the light output for a bracket angle of 45 degrees, and FIG. 9 shows the light output for a bracket angle of 60 degrees. These angles are provided for illustration only and are not intended to be limiting on the range of angles that may be employed.

As shown, changing the direction of the light output by altering the orientation of the ceiling lights 11 changes the area covered by reflection of light from the ceiling of the cabin. In particular, the reflected light with the bracket angles of 30 degrees and 60 degrees is more concentrated in the area of the aisle 7 than with the bracket angle of 45 degrees.

Controlling the direction of the light output by adjusting the orientation of the ceiling lights 11 may be used in combination with emergency lighting systems that employ photoluminescent material. Photoluminescent material absorbs and emits light when exposed to a light source and continues to emit light for a period of time after the light source is no longer available.

The photoluminescent material may be incorporated in tracks 59, 61 arranged to extend along one or both sides of the aisle 7. The illumination provided by the photoluminescent material may not be visible under normal lighting conditions in the cabin. However, in an emergency, it may be that the ceiling lights 11 and wall lights 13 are not working due to loss of the power supply to the lighting system, for example the wiring may be damaged, or the light is blocked due to the presence of smoke in the cabin, for example as the result of a fire.

In these conditions, the light emitted by the photoluminescent material is visible and the tracks 59, 61 define a path along which passengers can move to an exit when the aircraft is evacuated in an emergency. The path may be continuous. The path may be configured according to the layout of the aircraft to include sections that are straight or curved. However, it may be that locating the photoluminescent material on or near floor level at the sides of the aisle reduces the exposure of the photoluminescent material to sources of light necessary to charge the photoluminescent material and to maintain the photoluminescent material in a charged condition.

It is desirable that the photoluminescent material is in a fully charged condition at the time of an emergency to maximise both the brightness and the duration of the emitted light when the aircraft electrical lighting system may not be working or may be rendered ineffective by the presence of smoke in the cabin. By adjusting the orientation of the ceiling lights 11 so that the light output is more concentrated in the region of the aisle 7, it may be that the time to charge the photoluminescent material may be reduced and/or it may be that the photoluminescent can be maintained in a fully charged condition prior to being required in an emergency.

Figure 10:
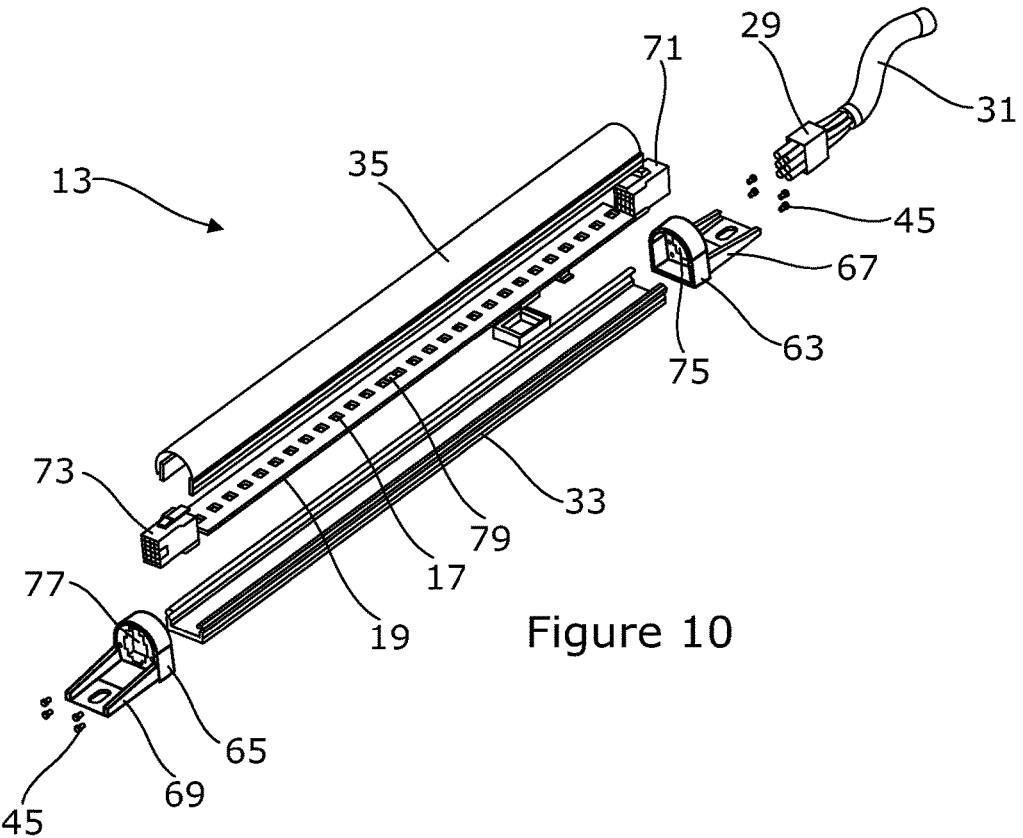
FIG. 10 is an exploded perspective view of a wall light unit.

A wall light 13 is shown in more detail in FIG. 10. Like reference numerals are used to indicate the same or similar parts to the ceiling light 11 shown and described with reference to FIG. 2. The same or similar parts will be understood from the description of the ceiling light 11 and are therefore not described in detail again.

The casing 15 of the wall light 13 is provided with end caps 63, 65 with integral brackets 67, 69 for mounting the wall light 13 on a mounting surface. It will be understood that the wall light 13 could be mounted using one or more of the brackets 47 as described above for the ceiling lights 11 if desired. In this case, the end caps 63, 65 could be replaced by end caps without the integral brackets 67, 69.

The support member 19 for the LEDs 17 is provided with connectors 71, 73 at both ends that are received in openings 75, 77 in the end caps 63, 65. The connectors 71, 73 may be the same or different. The connectors 71, 73 allow two more wall lights 13 to be connected together in series and powered by the same power source so as to be operated together. It will be understood that the wall lights 13 could be connected to the power source by separate power supply cables as described above for the ceiling lights 11 if desired.

It may be that the above-described ceiling lights 11 and/or wall lights 13 are provided with an interface which enables the light intensity and/or colour blend levels of the light output from each light 11, 13 to be adjusted independently of the other ceiling lights 11 and/or wall lights 13. In this way, the light output of the lights 11, 13 can be calibrated to suite requirements of a given installation. A control device, for example a handheld remote (not shown), may be used for calibrating the lights 11, 13.

The remote may communicate with the interface via a wireless link, for example an infra-red link. In other arrangements a wired link may be employed. The remote may be provided with an infra-red transmitter and each light 11, 13 may be provided with an interface having an infra-red receiver 79. The receiver 79 may be located on the support member 19. Each light 11, 13 may have a calibration memory. Access to the calibration memory may be protected to prevent inadvertent or unauthorised access to the calibration memory. For example, access may require a sequence of commands in the correct order and within a permitted window (time) before calibration adjustments can be made and then stored in the calibration memory.

Adjusting the light intensity and/or colour blend levels of each light 11, 13 independently may be useful when replacing a damaged or broken light, the light intensity and/or colour blend levels of the new light can be adjusted to match those of the other lights. It may be that the lights 11, 13 have a plurality of light intensity settings, for example low (dim), medium (normal) and high (bright). Each setting may be calibrated. The lights may be controlled to select the same or different settings according to the location of the lights and requirements.

The construction and arrangement of the elements of the lighting system as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.)

without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The order or sequence of any process or method steps may be varied or re-sequenced according to alternative embodiments. Any means-plus-function clause is intended to cover the structures described herein as performing the recited function and not only structural equivalents, but also equivalent structures. Other substitutions, modifications, changes and omissions may be made in the design, operating configuration, and arrangement of the preferred and other exemplary embodiments without departing from the scope of the appended claims.

The invention claimed is:

1. A lighting system for an aircraft cabin, the lighting system including an electrical light source and a photoluminescent light source,
wherein in use the electrical light source is configured to charge the photoluminescent light source,
wherein the system is arranged such that the photoluminescent light source is at or near floor level of the cabin and arranged to guide passengers to an exit and the electrical light source is provided at or near a ceiling of the cabin;
wherein the system is configured such that in use, an area in which the photoluminescent material is located receives a light output from the electrical light source to charge the photoluminescent material, the photoluminescent material being in a track on the floor along an aisle of the aircraft cabin so that an upper surface of the track is exposed to light from the electrical light source and the photoluminescent material is charged by light through the upper surface of the track;
wherein the electrical light source is adjustable to configure the light source so that the light output is more concentrated in the area of the aisle;
wherein the electrical light source comprises a plurality of light emitting diodes and a housing configured for attaching a bracket to mount the electrical light source on a support surface of the cabin; and
wherein the bracket is adjustable to alter the orientation of the light emitting diodes to concentrate the light output in the area of the aisle.

2. A lighting system according to claim 1 wherein the light emitting diodes are located on top of storage units extending along the length of the cabin to illuminate the ceiling and the orientation of the light emitting diodes is adjusted so that light reflected from the ceiling is more concentrated in the area of the aisle.

3. A lighting system according to claim 1 wherein each bracket has a base portion for securing to a mounting surface and a connector portion for attaching to the electrical light source, and the connector portion is adjustable to change the orientation of the light.

4. A lighting system according to claim 3 wherein the connector portion is attached to the base portion by a hinge portion for pivotal movement relative to the base portion to adjust an angle at which the connector portion extends to the base portion.

5. A lighting system according to claim 4 wherein a device is provided to pivot the connector portion about the hinge portion to adjust the angle between the connector portion and the base portion, wherein the device is configured to provide continuous or step-wise adjustment of the angle over a pre-determined range of adjustment.

6. A lighting system according to claim 5 wherein the range of adjustment is from 0 to 180 degrees.

7. A lighting system according to claim 1 wherein the housing has longitudinal formations along both sides and the connector portion of the bracket is engageable with the formations to secure the housing to the bracket at any position along the length of the housing, wherein the housing is detachable from the bracket.

8. A lighting system according to claim 1 further comprising an interface, wherein the light source is programmable via the interface for calibrating light intensity and/or colour of a light output of the light source.

9. A lighting system according to claim 8 wherein calibration of the light intensity and/or colour of the light output is stored in a memory, wherein the memory is configured to prevent inadvertent or unauthorized access.

10. A lighting system according to claim 8 wherein the light source further comprises a plurality of light intensity settings.

11. A lighting system according to claim 8 wherein the interface includes a receiver for programming the light source via a control device having a transmitter for communicating with the receiver via an infra-red link.

12. A lighting system according to claim 8 wherein the light source is mounted on a carrier including a printed circuit board configured to control the light intensity and/or colour of the light output of the light source in response to calibration of the light output.

13. A lighting system according to claim 8 wherein the light source comprises a plurality of light emitting diodes wherein the light output of any light emitting diode can be calibrated to be the same as or different from the light output of any other light emitting diode.

14. An aircraft cabin comprising a lighting system, the lighting system including an electrical light source and a photoluminescent light source;
wherein in use the electrical light source is configured to charge the photoluminescent light source, the system being arranged such that the photoluminescent light source is at or near floor level of the cabin for guiding passengers to an exit and the electrical light source is provided at or near a ceiling of the cabin;
wherein the system is configured within the aircraft cabin such that an area in which the photoluminescent material is located receives a light output from the electrical light source, the photoluminescent material being provided in a track on the floor along an aisle of the aircraft cabin such that an upper surface of the track is exposed to light from the electrical light source and the photoluminescent material is chargeable by light from the electrical light source through the upper surface of the track;
wherein the electrical light source is adjustable to configure the light source so that the light output is more concentrated in the area of the aisle;
wherein the electrical light source comprises a plurality of light emitting diodes and a housing having an elongate base and an elongate cover mounted along the length of the cabin;
wherein the base is configured for attaching a bracket to mount the electrical light source on a support surface of the cabin; and
wherein the bracket is adjustable to alter the orientation of the light emitting diodes to concentrate the light output in the area of the aisle.

15. An aircraft cabin comprising a lighting system according to claim 14 wherein each bracket has a base portion for securing to a mounting surface and a connector portion is adjustable relative to the base portion to alter the orientation of the light.

16. An aircraft cabin comprising a lighting system according to claim 14 wherein the connector portion is configured for pivotal movement relative to the base portion to adjust an angle at which the connector portion extends to the base portion.

17. An aircraft cabin comprising a lighting system according to claim 14 wherein the light emitting diodes are located on top of storage units extending along the length of the cabin to illuminate the ceiling and the orientation of the light emitting diodes is adjustable so that light reflected from the ceiling is more concentrated in the area of the aisle.

18. An aircraft cabin comprising a lighting system according to claim 15 wherein the connector portion is attached to the bracket portion by a hinge portion and a device is provided to pivot the connector portion about the hinge portion to adjust the angle between the connector portion and the base portion.

* * * * *